(12) United States Patent
Onomichi et al.

(10) Patent No.: US 8,894,005 B2
(45) Date of Patent: Nov. 25, 2014

(54) LANDING GEAR ASSEMBLY OF AIRCRAFT

(71) Applicant: Sumitomo Precision Products Co., Ltd., Amagasaki-shi (JP)

(72) Inventors: Yasuto Onomichi, Amagasaki (JP);
Kazunari Tada, Amagasaki (JP);
Takeshi Otani, Amagasaki (JP); Hiroshi Morimoto, Amagasaki (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 0 days.

(21) Appl. No.: 14/042,469

(22) Filed: Sep. 30, 2013

(65) Prior Publication Data

US 2014/0027567 A1 Jan. 30, 2014

Related U.S. Application Data

(63) Continuation of application No. PCT/JP2012/056349, filed on Mar. 13, 2012.

(30) Foreign Application Priority Data

Apr. 2, 2011 (JP) .................................. 2011-082327

(51) Int. Cl.
*B64C 25/50* (2006.01)
(52) U.S. Cl.
CPC ..................... *B64C 25/50* (2013.01)
USPC .......................................................... 244/50
(58) Field of Classification Search
CPC ..................................................... B64C 25/50
USPC ..................... 244/50, 103 R, 102 R; 701/120
See application file for complete search history.

(56) References Cited

U.S. PATENT DOCUMENTS

| | | | |
|---|---|---|---|
| 2,474,630 A * | 6/1949 | Jamison | 244/50 |
| 3,489,376 A * | 1/1970 | Steffen et al. | 244/50 |
| 3,753,540 A * | 8/1973 | Renner | 244/50 |
| 5,513,821 A | 5/1996 | Ralph | |
| 7,975,960 B2 * | 7/2011 | Cox et al. | 244/50 |
| 8,544,791 B2 * | 10/2013 | Oyama et al. | 244/50 |
| 2009/0261197 A1 * | 10/2009 | Cox et al. | 244/50 |
| 2010/0044500 A1 * | 2/2010 | Oyama et al. | 244/50 |

FOREIGN PATENT DOCUMENTS

| | | |
|---|---|---|
| JP | 53-105000 | 12/1978 |
| JP | 64-9900 U | 1/1989 |
| JP | 6-99893 A | 4/1994 |
| JP | 8-133189 A | 5/1996 |
| JP | 10-230831 A | 9/1998 |
| JP | 2007-154983 A | 6/2007 |
| JP | 2008-168656 A | 7/2008 |

* cited by examiner

*Primary Examiner* — Philip J Bonzell
(74) *Attorney, Agent, or Firm* — Knobbe Martens Olson & Bear LLP (57) ABSTRACT

A landing gear assembly includes a control system configured to output an amount of operation corresponding to an operated physical amount; a wheel; a landing gear supported by a frame of the aircraft, and configured to rotatably support the wheel; a steering system configured to steer the wheel using the amount of operation as a command value; and a detection sensor configured not to output a detection signal when the aircraft flies in air, and to output the detection signal when the aircraft stays on ground. When the detection sensor does not output the detection signal, or when speed of the aircraft is higher than first limitation speed, the steering system orients rotation of the wheel in a longitudinal direction of the aircraft in disregard of the amount of operation.

19 Claims, 6 Drawing Sheets

LANDING GEAR ASSEMBLY OF AIRCRAFT

CROSS-REFERENCE TO RELATED APPLICATIONS

This is a continuation of International Application No. PCT/JP2012/056349 filed on Mar. 13, 2012, which claims priority to Japanese Patent Application No. 2011-082327 filed on Apr. 2, 2011. The entire disclosures of these applications are incorporated by reference herein.

BACKGROUND

The present disclosure relates to landing gear assemblies of aircrafts, and more particularly to landing gear assemblies characterized by operation at landing or take-off of the aircrafts. Aircrafts need to change their traveling direction at take-off, landing, and taxing.

Thus, each aircraft includes a landing gear assembly having a steering function.

For example, large commercial aircrafts include main wheels and steerable nose wheels. The nose wheels are provided on the nose landing gear of the aircraft, and the main wheels are provided on main landing gears under wings.

Occasionally, the main wheels on the wings or on the center of the frame have the steering function.

A control system is rudder pedals, or a steering handle operated by a pilot.

The steering handle is provided next to the pilot, and operated by a hand of the pilot. The rudder pedals are provided under foot of the pilot, and operated by the feet of the pilot.

Usually, the rudder pedals are also used for operating the rudder of the aircraft.

The landing gear assembly includes wheels, a landing gear, and a steering system.

The steering system includes a hydraulic actuator, an upper cable, and a lower cable.

The landing gear is supported by the frame of the aircraft, and rotatably supports the wheels. The landing gear is extensible. When the landing gear completely extends, a built-in cam fixes the wheels to roll in the longitudinal direction of an aircraft. The hydraulic actuator allows the wheels to revolve around the vertical axis.

The upper cable and the lower cable are mechanical elements transmitting the amount of operation of the control system to the hydraulic actuator.

When the pilot steps on the rudder pedals, the upper cable is drawn to one side along the longitudinal direction of the cable. When the upper cable is drawn to the one side, the lower cable is drawn to the one side along the longitudinal direction of the cable.

The hydraulic actuator extends in accordance with the movement of the lower cable to revolve the wheels.

For example, when the pilot fully steps on the rudder pedals, the wheels revolve within a range of 8 degrees.

For example, when the pilot fully turns the steering handle, the wheels revolve within a range of 78 degrees.

The pilot operates the rudder pedals to move the rudder of the aircraft, thereby adjusting the position of the aircraft during flight. At this time, the movement of the upper cable is not to be transmitted to the lower cable.

When the wheels touch down, the movement of the upper cable is transmitted to the lower cable.

Before the wheels touch down in a landing step, when the pilot operates the rudder pedals, only the rudder of the aircraft moves. After the wheels touch down, when the pilot operates the rudder pedals, the wheels revolve.

When the aircraft moves out of the runway, the pilot operates the steering handle.

In a take-off step, while the wheels touch down, when the pilot operates the rudder pedals, the wheels revolve. When the wheels are off the ground and the pilot operates the rudder pedals, only the rudder of the aircraft moves.

If the function of not transmitting the movement of the upper cable to the lower cable does not work well, the aircraft changes its position in accordance with the revolving angle of the wheels at the moment when the wheels touch down at landing. After the wheels are off the ground at take-off, the wheels revolve. When the cam does not operate well, the wheels need to be stored in the frame of the aircraft while revolving.

In recent years, aircrafts tend to be fly-by-wire controlled. Landing gear assemblies also have the tendency.

As example fly-by-wire control for the steering function of a landing gear assembly, an upper cable and a lower cable are removed, the movement of rudder pedals or a steering handle is input to an electronic controller so that the electronic controller drives a control valve controlling a hydraulic actuator.

Assume that the wheel steering system is steer-by-wire controlled. When wheels do not touch down, it is necessary to prevent the amount of operation of the rudder pedals from reflecting the steering angle of the wheels.

SUMMARY

The present disclosure was made in view of the above-described problems. It is an objective of the present disclosure to provide a highly reliable landing gear assembly of an aircraft with a simple configuration.

In order to achieve the objective, a landing gear assembly of an aircraft according to an aspect of the present disclosure includes a control system configured to output an amount of operation corresponding to an operated physical amount; a wheel; a landing gear supported by a frame of the aircraft, and configured to rotatably support the wheel; a steering system configured to steer the wheel using the amount of operation as a command value; and a detection sensor configured not to output a detection signal when the aircraft flies in air, and to output the detection signal when the aircraft stays on ground. When the detection sensor does not output the detection signal, or when speed of the aircraft is higher than first limitation speed, the steering system orients rotation of the wheel in a longitudinal direction of the aircraft in disregard of the amount of operation.

With this configuration of the present disclosure, the control system outputs the amount of operation corresponding to the operated physical amount. The landing gear is supported by the frame of the aircraft, and rotatably supports the wheel. The steering system steers the wheel using the amount of operation as the command value. The detection sensor does not output the detection signal when the aircraft flies in the air, and outputs the detection signal when the aircraft stays on the ground. When the detection sensor does not output the detection signal, or when the speed of the aircraft is higher than the first limitation speed, the steering system orients the rotation of the wheel in the longitudinal direction of the aircraft in disregard of the amount of operation. As a result, the wheel can be steered by operating the control system, and, during the flight, the rotation of the wheel can be oriented in the longitudinal direction of the aircraft in disregard of the control system.

In order to achieve the objective, a landing gear assembly of an aircraft according to another aspect of the present disclosure includes a control system configured to output an amount of operation corresponding to an operated physical amount; a wheel; a landing gear supported by a frame of the aircraft, and configured to rotatably support the wheel; a steering system configured to steer the wheel using the amount of operation as a command value; and a plurality of detection sensors, each configured not to output a detection signal when the aircraft flies in air, and to output the detection signal when the aircraft stays on ground. When outputs of the plurality of detection sensors are not identical and speed of the aircraft is higher than second limitation speed, the steering system orients rotation of the wheel in a longitudinal direction of the aircraft in disregard of the amount of operation.

With this configuration of the present disclosure, the control system outputs the amount of operation corresponding to the operated physical amount. The landing gear is supported by the frame of the aircraft, and rotatably supports the wheel. The steering system steers the wheel using the amount of operation as the command value. Each of the plurality of detection sensors does not output the detection signal when the aircraft flies in the air, and outputs the detection signal when the aircraft stays on the ground. When the outputs of the plurality of detection sensors are not identical and the speed of the aircraft is higher than the second limitation speed, the steering system orients the rotation of the wheel in the longitudinal direction of the aircraft in disregard of the amount of operation. As a result, the wheel can be steered by operating the control system, and, during the flight, the rotation of the wheel can be oriented in the longitudinal direction of the aircraft in disregard of the control system.

In order to achieve the objective, a landing gear assembly of an aircraft according to yet another aspect of the present disclosure includes a control system configured to output an amount of operation corresponding to an operated physical amount; a wheel; a landing gear supported by a frame of the aircraft, and configured to rotatably support the wheel; a steering system configured to steer the wheel using the amount of operation as a command value; and a plurality of detection sensors, each configured not to output a detection signal when the aircraft flies in air, and to output the detection signal when the aircraft stays on ground. When speed of the aircraft is higher than first limitation speed, or when outputs of the plurality of detection sensors are not identical and the speed of the aircraft is higher than second limitation speed, the steering system orients rotation of the wheel in a longitudinal direction of the aircraft in disregard of the amount of operation. The second limitation speed is lower than the first limitation speed.

With this configuration of the present disclosure, the control system outputs the amount of operation corresponding to the operated physical amount. The landing gear is supported by the frame of the aircraft, and rotatably supports the wheel. The steering system steers the wheel using the amount of operation as the command value. Each of the plurality of detection sensors does not output the detection signal when the aircraft flies in the air, and the outputs the detection signal when the aircraft stays on the ground. The second limitation speed is lower than the first limitation speed. When the speed of the aircraft is higher than the first limitation speed, or when outputs of the plurality of detection sensors are not identical and the speed of the aircraft is higher than the second limitation speed, the steering system orients the rotation of the wheel in the longitudinal direction of the aircraft in disregard of the amount of operation. As a result, the wheel can be steered by operating the control system, and, during the flight, the rotation of the wheel can be oriented in the longitudinal direction of the aircraft in disregard of the control system.

In order to achieve the objective, a landing gear assembly of an aircraft according to still another aspect of the present disclosure includes a control system configured to output an amount of operation corresponding to an operated physical amount; a wheel; a landing gear supported by a frame of the aircraft, and configured to rotatably support the wheel; a steering system configured to steer the wheel using the amount of operation as a command value; and a plurality of detection sensors, each configured not to output a detection signal when the aircraft flies in air, and to output the detection signal when the aircraft stays on ground. When the plurality of detection sensors do not output the detection signals, when speed of the aircraft is higher than first limitation speed, or when outputs of the plurality of detection sensors are not identical and the speed of the aircraft is higher than second limitation speed, the steering system orients rotation of the wheel in a longitudinal direction of the aircraft in disregard of the amount of operation. The second limitation speed is lower than the first limitation speed.

With this configuration of the present disclosure, the control system outputs the amount of operation corresponding to the operated physical amount. The landing gear is supported by the frame of the aircraft, and rotatably supports the wheel. The steering system steers the wheel using the amount of operation as the command value. Each of the plurality of detection sensors does not output the detection signal when the aircraft flies in the air, and outputs the detection signal when the aircraft stays on the ground. The second limitation speed is lower than the first limitation speed. When the plurality of detection sensors do not output the detection signals, when the speed of the aircraft is higher than the first limitation speed, or when the outputs of the plurality of detection sensors are not identical and the speed of the aircraft is higher than the second limitation speed, the steering system orients the rotation of the wheel in the longitudinal direction of the aircraft in disregard of the amount of operation. As a result, the wheel can be steered by operating the control system, and, during the flight, the rotation of the wheel is oriented in the longitudinal direction of the aircraft in disregard of the control system.

In order to achieve the objective, a landing gear assembly of an aircraft according further another aspect to the present disclosure includes a control system configured to output an amount of operation corresponding to an operated physical amount; a wheel; a landing gear supported by a frame of the aircraft, and configured to rotatably support the wheel; a steering system configured to orient rotation of the wheel in a longitudinal direction of the aircraft in disregard of the amount of operation; and a plurality of detection sensors, each configured not to output a detection signal when the aircraft flies in air, and to output the detection signal when the aircraft stays on ground. When the plurality of detection sensors output the detection signals, or when outputs of the plurality of detection sensors are not identical and speed of the aircraft is lower than second limitation speed, the steering system steers the wheel using the amount of operation as a command value.

With this configuration of the present disclosure, the control system outputs the amount of operation corresponding to the operated physical amount. The landing gear is supported by the frame of the aircraft, and rotatably supports the wheel. The steering system orients the rotation of the wheel in the longitudinal direction of the aircraft in disregard of the amount of operation. Each of the plurality of detection sensors does not output the detection signal when the aircraft flies in the air, and outputs the detection signal when the aircraft stays on the ground. When the plurality of detection sensors output the detection signals, or when the outputs of the plurality of detection sensors are not identical and the speed of the aircraft is lower than the second limitation speed, the steering system steers the wheel using the amount of operation as the command value. As a result, the rotation of the wheel can be oriented in the longitudinal direction of the aircraft, and, when the aircraft is not in flight, the wheel can be steered by operating the control system.

The landing gear assemblies according to aspects of the present disclosure will be described below. The present disclosure includes the below-described aspects alone or in combination.

In a landing gear assembly according to an aspect of the present disclosure, the second limitation speed is lower than aircraft speed for safe touchdown at landing.

With this configuration of the present disclosure, the second limitation speed is lower than the aircraft speed for safe touchdown at landing. As a result, whether or not the wheel touches down can be reliably determined.

In the landing gear assembly according to another aspect of the present disclosure, the first limitation speed is aircraft speed for safe touchdown at landing.

With this configuration of the present disclosure, the first limitation speed is the aircraft speed for safe touchdown at landing. As a result, whether or not the wheel touches down can be reliably determined.

In a landing gear assembly according to yet another aspect of the present disclosure, the landing gear increases and decreases a distance between a mounting point of the frame of the aircraft and an axle, and includes a cam mechanism configured to mechanically forcibly orient the rotation of the wheel in the longitudinal direction of the aircraft when the distance increases. The steering system includes an electronic controller configured to receive the amount of operation, and to output a valve drive signal, a hydraulic actuator configured to revolve the wheel around a vertical axis, a hydraulic control valve configured to receive the valve drive signal, and to supply hydraulic fluid to the hydraulic actuator to control a revolving angle of the wheel, and a shut-off valve configured to shut off the hydraulic fluid supplied to the hydraulic control valve. The steering system activates the shut-off valve to shut off supply of the hydraulic fluid so that the rotation of the wheel is oriented in the longitudinal direction of the aircraft in disregard of the amount of operation. The electronic controller inputs to the hydraulic control valve, the valve drive signal for orienting the rotation of the wheel in the longitudinal direction of the aircraft.

With this configuration of the present disclosure, the landing gear increases and decreases the distance between the mounting point of the frame of the aircraft and the axle. When the distance increases, the cam mechanism mechanically forcibly orients the rotation of the wheel in the longitudinal direction of the aircraft. The steering system includes the electronic controller, the hydraulic actuator, the hydraulic control valve, and the shut-off valve. The electronic controller receives the amount of operation, and outputs the valve drive signal. The hydraulic actuator revolves the wheel around the vertical axis. The hydraulic control valve receives the valve drive signal, and supplies the hydraulic fluid to the hydraulic actuator to control the revolving angle of the wheel. The shut-off valve shuts off the hydraulic fluid supplied to the hydraulic control valve. The steering system activates the shut-off valve to shut off the supply of the hydraulic fluid so that the rotation of the wheel is oriented in the longitudinal direction of the aircraft in disregard of the amount of operation. The electronic controller outputs to the hydraulic control valve, the valve drive signal for orienting the rotation of the wheel in the longitudinal direction of the aircraft. As a result, even if one of the shut-off valve or the electronic controller malfunctions, the rotation of the wheel is oriented in the longitudinal direction of the aircraft during the flight.

In the landing gear assembly according to still another aspect of the present disclosure, the detection sensor is a WOW sensor not outputting the detection signal when a weight of the aircraft does not act on the wheel, and outputting the detection signal when the weight acts on the wheel.

With this configuration of the present disclosure, even if the WOW sensor malfunctions, the orientation of the wheel precisely corresponds to the conditions of the aircraft.

The above-described landing gear assemblies of the aircraft of the present disclosure provide the following advantages.

The control system outputs the amount of operation corresponding to the operated physical amount. The landing gear is supported by the frame of the aircraft, and rotatably supports the wheel. The steering system steers the wheel using the amount of operation as the command value. The detection sensor does not outputs the detection signal when the aircraft flies in the air, and outputs the detection signal when the aircraft stays on the ground. In the landing gear assembly with the above-described configuration, when the detection sensor does not output the detection signal, or when the speed of the aircraft is higher than the first limitation speed, the steering system orients the rotation of the wheel in the longitudinal direction of the aircraft in disregard of the amount of operation. As a result, the wheel is steered by operating the control system, and, during the flight, the rotation of the wheel is oriented in the longitudinal direction of the aircraft in disregard of the control system.

In the above-described landing gear assembly, which includes the plurality of detection sensors, when the outputs of the plurality of detection sensors are not identical and the speed of the aircraft is higher than the second limitation speed, the steering system orients the rotation of the wheel in the longitudinal direction of the aircraft in disregard of the amount of operation. As a result, the wheel can be steered by operating the control system, and, during the flight, the rotation of the wheel can be oriented in the longitudinal direction of the aircraft in disregard of the control system.

In the above-described landing gear assembly, which includes the plurality of detection sensors, when the speed of the aircraft is higher than the first limitation speed, or when the outputs of the plurality of detection sensors are not identical and the speed of the aircraft is higher than the second limitation speed, the steering system orients the rotation of the wheel in the longitudinal direction of the aircraft in disregard of the amount of operation. As a result, the wheel can be steered by operating the control system, and, during the flight, the rotation of the wheel can be oriented in the longitudinal direction of the aircraft in disregard of the control system.

In the above-described landing gear assembly, which includes the plurality of detection sensors, when the plurality of detection sensors do not output the detection signals, when the speed of the aircraft is higher than the first limitation speed, or when the outputs of the plurality of detection sensors are not identical and the speed of the aircraft is higher than the second limitation speed, the steering system orients the rotation of the wheel in the longitudinal direction of the aircraft in disregard of the amount of operation. As a result, the wheel can be steered by operating the control system, and, during the flight, the rotation of the wheel can be oriented in the longitudinal direction of the aircraft in disregard of the control system.

In addition, the control system outputs the amount of operation corresponding to the operated physical amount. The landing gear is supported by the frame of the aircraft, and rotatably supports the wheel. The steering system orients the rotation of the wheel in the longitudinal direction of the aircraft in disregard of the amount of operation. Each of the plurality of detection sensors does not output the detection signal when the aircraft flies in the air, and to output the detection signal when the aircraft stays on the ground. In the landing gear assembly with the above-described configuration, when the plurality of detection sensors output the detection signals, or when the outputs of the plurality of detection sensors are not identical and the speed of the aircraft is lower than the second limitation speed, the steering system steers the wheel using the amount of operation as the command value. As a result, the rotation of the wheel can be oriented in the longitudinal direction of the aircraft, and, when the aircraft is not in flight, the wheel can be steered by operating the control system.

The second limitation speed is lower than the aircraft speed for safe touchdown at landing. As a result, whether or not the wheel touches down can be reliably determined.

The first limitation speed is the aircraft speed for safe touchdown at landing. As a result, whether or not the wheel touches down can be reliably determined.

The landing gear increases and decreases the distance between the mounting point of the frame of the aircraft and the axle. When the distance increases, the rotation of the wheel is mechanically forcibly oriented in the longitudinal direction of the aircraft. The steering system includes the electronic controller, the hydraulic actuator, the hydraulic control valve, and the shut-off valve. The steering system activates the shut-off valve to shut off supply of the hydraulic fluid. The electronic controller outputs to the hydraulic control valve, the valve drive signal for orienting the rotation of the wheel in the longitudinal direction of the aircraft. As a result, even if any one of the shut-off valve or the electronic controller malfunctions, the rotation of the wheel can be oriented in the longitudinal direction of the aircraft during the flight.

The detection sensor is the WOW sensor not outputting the detection signal when a weight of the aircraft does not act on the wheel, and outputting the detection signal when the weight of the aircraft acts on the wheel. As a result, even if the WOW sensor malfunctions, the orientation of the wheel precisely corresponds to the conditions of the aircraft.

Therefore, the present disclosure provides a highly reliable landing gear assembly of an aircraft with a simple configuration.

DETAILED DESCRIPTION

Most preferred embodiments of the present disclosure will be described hereinafter with reference to the drawings. In the drawings, the same reference characters are used to represent equivalent elements, and repetitive explanation will be omitted.

First, a landing gear assembly according to a first embodiment of the present disclosure will be described below with reference to the drawings.

Figure 1:
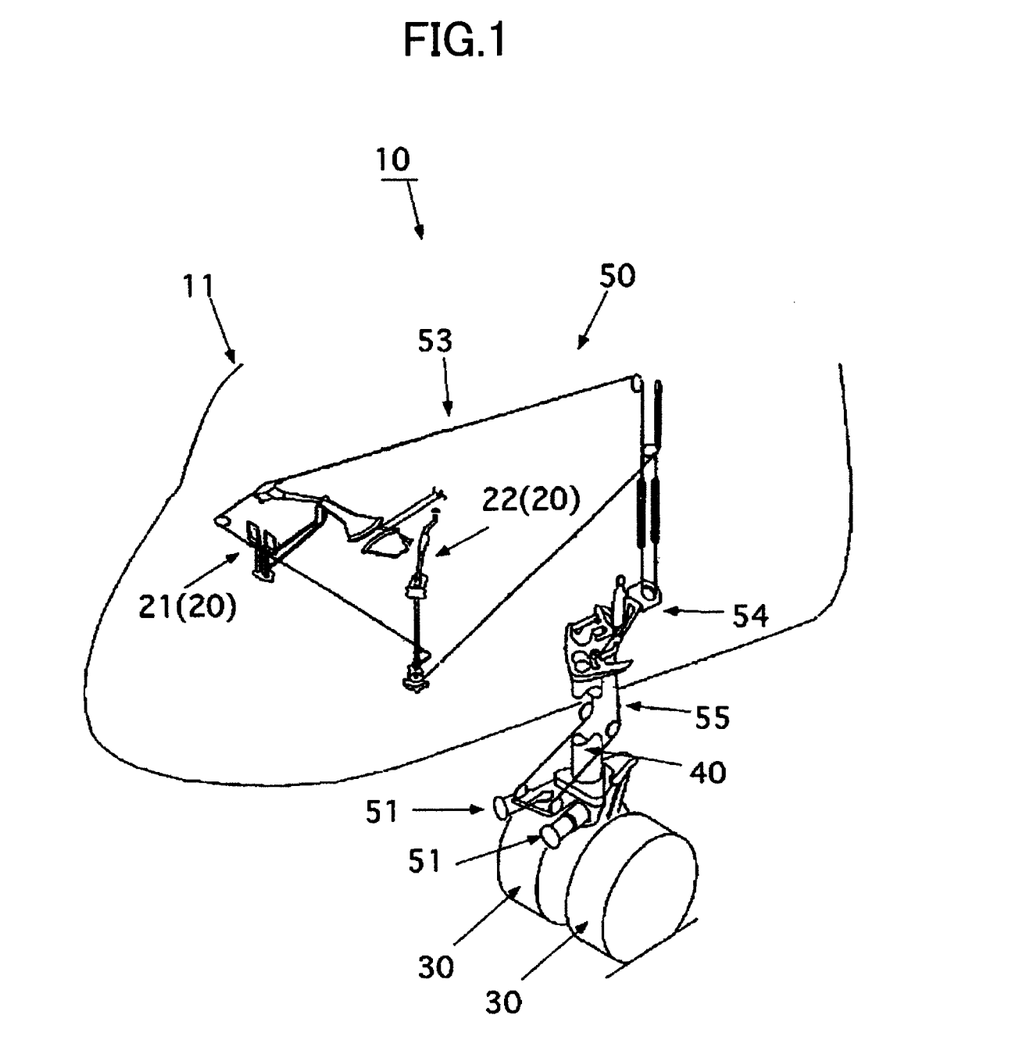
FIG. 1 is a conceptual view of a landing gear assembly according to a first embodiment of the present disclosure.
Figure 2:
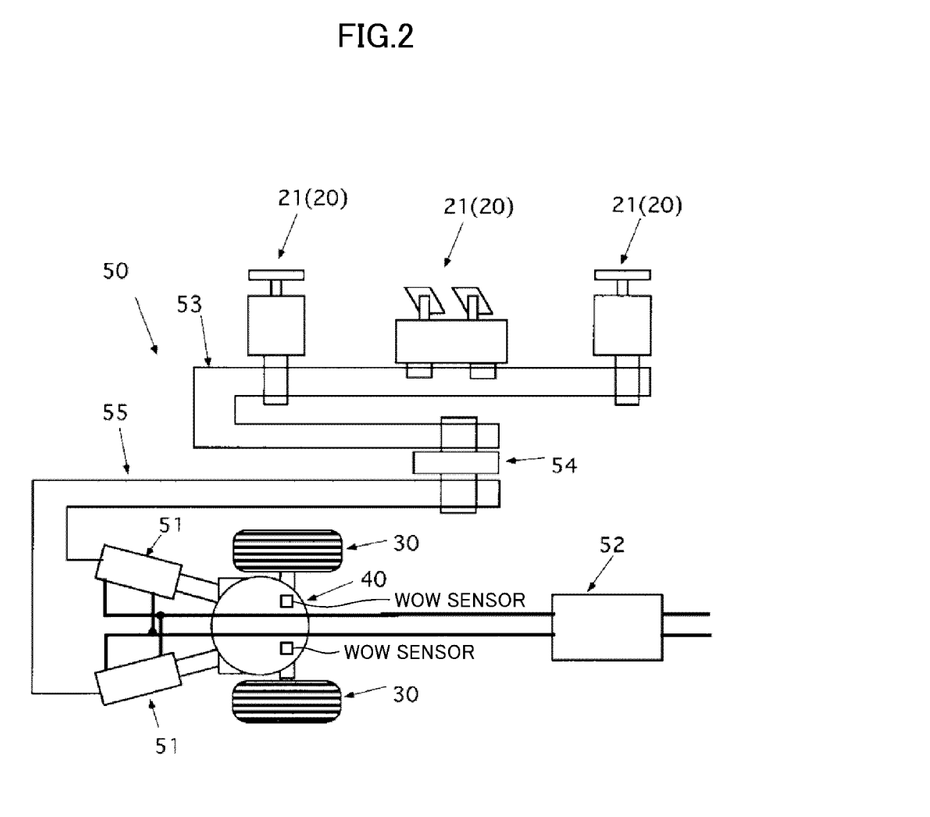
FIG. 2 illustrates a line system of the landing gear assembly according to the first embodiment of the present disclosure.

FIG. 1 is a conceptual view of the landing gear assembly according to the first embodiment. FIG. 2 illustrates a line system of the landing gear assembly according to the first embodiment. For simplicity of the explanation, an example will be described where the landing gear assembly is provided in the nose of an aircraft.

The system of the landing gear assembly according to the first embodiment is hereinafter referred to as "steer-by-mechanical connection."

The landing gear assembly of an aircraft supports an aircraft 10 at landing, and includes a control system 20, wheels 30, a landing gear 40, a steering system 50, and a detection sensor.

The control system 20 outputs the amount of operation corresponding to the operated physical amount. For example, the control system 20 of the aircraft includes rudder pedals 21 and a steering handle 22.

The rudder pedals 21 are operated by the feet of a pilot. When the pilot steps on a pair of right and left rudder pedals, the wheels revolve around the vertical axis in accordance with the stepped strokes. Usually, the pilot steps on the rudder pedals, thereby steering the wheels, and in addition, controlling the orientation of the rudder of the aircraft.

The steering handle 22 is provided next to the pilot, and turned by the hand of the pilot for operation. The pilot steers the wheels 30 at a large angle by turning the steering handle 22.

The wheels 30 are rotatably supported by a lower end of the landing gear 40.

For example, each wheel 30 includes a wheel body and a rubber tire put on the periphery of the wheel body.

A pair of wheels are attached from the right and left with a lower portion of the landing gear interposed therebetween.

In an on-ground position, the wheels 30 revolve around the vertical axis, and rotate around the horizontal axis.

The landing gear 40 is supported by the frame of the aircraft, and rotatably supports the wheels.

For example, the landing gear 40 is supported by the frame of the aircraft, and rotatably supports the wheels. The landing gear 40 may increase and decrease a distance between the mounting point of the frame of the aircraft and each axle.

The landing gear 40 is changeable between the position for storage and the on-ground position.

In the position for storage, hydraulic actuators 51, the landing gear 40, and the wheels 30 are stored in an aircraft frame 11.

In the on-ground position, the hydraulic actuators 51, the landing gear 40, and the wheels 30 are exposed to the outside of the aircraft frame 11.

In the on-ground position, the longitudinal direction of the landing gear 40 is along the vertical direction.

For example, the landing gear 40 includes an upper part, a lower part, a cam mechanism, and a storage mechanism.

The lower part is extensible guided by the upper part in the longitudinal direction. The lower part is biased by a biasing means in the longitudinal direction.

The lower part revolves using the longitudinal direction of the upper part as the revolving center.

In the on-ground position, the lower part is located under the upper part so that the biasing means carries the weight of the aircraft acting on the upper and lower parts.

An upper portion of the upper part is supported by the frame of the aircraft 10. The upper portion of the upper part is rotatably fixed to the aircraft frame.

The storage mechanism changes the position between the position for storage and the on-ground position.

The cam mechanism mechanically forcibly orients the rotation of the wheels in the longitudinal direction of the aircraft, when the lower part extends downward.

The steering system 50 steers the wheels 30 using the amount of operation as a command value, and orients the rotation of the wheels in the longitudinal direction of the aircraft regardless of the amount of operation. The steering system 50 includes the hydraulic actuators 51, a shut-off valve 52, an upper cable 53, a cable interlock 54, and a lower cable 55.

The hydraulic actuators 51 are cylinders revolving the wheels 30 around the upper and lower parts.

For example, a pair of hydraulic cylinders is provided on the right and left of the landing gear with their shaft centers intersecting each other. In the landing position, when one of the pair of hydraulic cylinders extends and the other retracts, the wheels 30 supported by the landing gear 40 revolve around the vertical axis in the rotation direction of the one. When the one of the pair of hydraulic cylinders retracts and the other extends, the wheels 30 supported by the landing gear 40 revolve around the vertical axis in the rotation direction of the other one.

The hydraulic cylinders extend and retract in accordance with the length of the extension of the lower cable 55, which will be described later.

The shut-off valve 52 shuts off oil pressure applied on the hydraulic actuators 51.

For example, when an off-signal is input to the shut-off valve, the shut-off valve operates to prevent application of the oil pressure on the hydraulic actuators, thereby nullifying the thrust of the hydraulic actuators.

When an on-signal is input to the shut-off valve, the oil pressure is applied on the hydraulic actuators, thereby generating the thrust of the hydraulic actuators.

The upper cable 53 transmits the amount of operation of the control system 20 from a pilot cabin to the cable interlock 54, which will be described later. The upper cable 53 is provided endless between the pilot cabin and the cable interlock 54. When the pilot steps on the pair of right and left rudder pedals 21, the upper cable 53 extends to one side in the longitudinal direction of the cable in accordance with the stepped stroke. In addition, when the pilot turns the steering handle 22, the upper cable 53 extends to one side in the longitudinal direction of the cable in accordance with the rotation angle and the rotation direction.

The cable interlock 54 transmits the movement of extension of the upper cable 53 to the lower cable 55.

The cable interlock 54 is fixed to the landing gear 40.

The cable interlock 54 prevents the movement of extension of the upper cable 53 from being transmitted to the lower cable 55 using a signal.

The lower cable 55 transmits the amount of operation from the upper cable 53 to the hydraulic cylinders via the cable interlock 54. The lower cable 55 receives the amount of operation from the upper cable 53. When the upper cable 53 extends, the lower cable 55 extends in the direction corresponding to the extension direction of the upper cable 53 in accordance with the distance of extension.

The detection sensor does not output a detection signal when the aircraft flies in the air, and outputs the detection signal when the aircraft stays on the ground.

The detection sensor may be a WOW sensor, which does not output a detection signal when the weight of the aircraft does not act on the wheels 30, and outputs the detection signal when the weight of the aircraft acts on the wheels 30.

The detection signal output from the WOW sensor is hereinafter referred to as a "WOW signal."

WOW is the abbreviation of Weight On Wheel.

For example, the WOW sensor is a limit sensor, which is provided in the landing gear 40, and is turned on in detecting that the lower part is located under the upper part.

Unless the wheels touch down, the weight of the aircraft does not act on the wheels, and the lower part extends from the upper part to turn off the limit sensor. When the wheels touch down, the weight of the aircraft acts on the wheels, and the lower part is located under the upper part to turn on the limit sensor. This on-signal is the WOW signal.

The operation of the landing gear assembly according to the first embodiment at take-off and at landing will be described below individually with reference to the drawings.

For the convenience of explanation, the detection signal is a WOW signal.

First, the operation of the steering system at take-off will be described with reference to the drawings.

Figure 5:
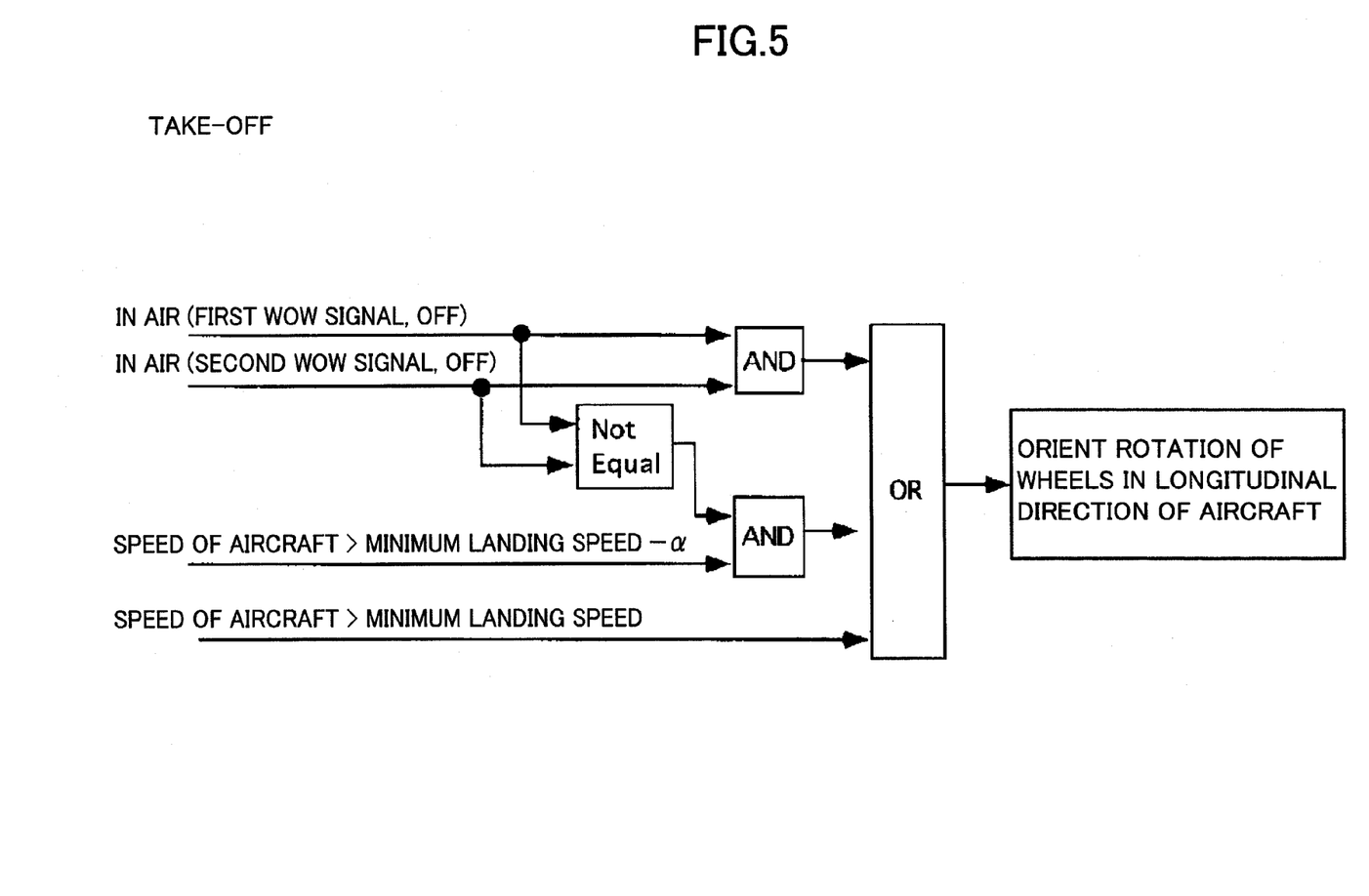
FIG. 5 is a first logic diagram of a wheel steering system according to an embodiment of the present disclosure.

FIG. 5 illustrates the control logics of the steering system at take-off.

Four types of control logics will be described below individually.

First Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

When the aircraft performs take-off operation and the wheels are off the ground, the WOW sensor stops outputting the WOW signal. Furthermore, the speed of the aircraft is higher than the first limitation speed.

When the WOW sensor stops outputting the WOW signal, or the speed of the aircraft is higher than the first limitation speed, the steering system orients the rotation of the wheels in the longitudinal direction of the aircraft in disregard of the amount of operation.

The first limitation speed may be aircraft speed for safe touchdown at landing.

For example, the steering system shuts off the communications between the upper cable 53 and the lower cable 55 using the cable interlock 54. Then, the shut-off valve 52 shuts off the application of oil pressure on the hydraulic actuators 51.

When the wheels are off the ground, the landing gear 40 extends the distance between the mounting point of the frame of the aircraft and each axle, and the cam mechanism mechanically forcibly orients the rotation of the wheels in the longitudinal direction of the aircraft.

With this configuration, even if the WOW sensor malfunctions, the steering system appropriately steers the wheels.

With this configuration, even if the speed value of the aircraft is incorrect, the steering system appropriately steers the wheels.

Second Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

When the aircraft performs take-off operation and the wheels are off the ground, the WOW sensor stops outputting the WOW signal. Furthermore, the speed of the aircraft is higher than the first limitation speed.

When the outputs of the plurality of WOW sensors are not identical, and the speed of the aircraft is higher than second limitation speed, the steering system orients the rotation of the wheels in the longitudinal direction of the aircraft in disregard of the amount of operation.

The second limitation speed may be lower than the aircraft speed for safe touchdown at landing.

For example, the steering system shuts off the communications between the upper cable 53 and the lower cable 55 using the cable interlock 54. Then, the shut-off valve 52 shuts off the application of oil pressure on the hydraulic actuators 51.

When the wheels are off the ground, the landing gear 40 extends and the cam mechanism mechanically forcibly orients the rotation of the wheels in the longitudinal direction of the aircraft.

With this configuration, even if any one of the plurality of WOW sensors malfunctions, the steering system appropriately steers the wheels.

With this configuration, even if the speed value of the aircraft is incorrect, the steering system appropriately steers the wheels.

Third Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

When the aircraft performs take-off operation and the wheels are off the ground, the WOW sensor stops outputting the WOW signal. Furthermore, the speed of the aircraft is higher than the first limitation speed.

When the speed of the aircraft is higher than the first limitation speed, or when the outputs of the plurality of WOW sensors are not identical and the speed of the aircraft is higher than the second limitation speed, the steering system orients the rotation of the wheels in the longitudinal direction of the aircraft in disregard of the amount of operation.

The second limitation speed may be lower than the aircraft speed for safe touchdown at landing.

For example, the steering system shuts off the communications between the upper cable 53 and the lower cable 55 using the cable interlock 54. Then, the shut-off valve 52 shuts off the application of oil pressure on the hydraulic actuators 51.

When the wheels are off the ground, the landing gear 40 extends and the cam mechanism mechanically forcibly orients the rotation of the wheels in the longitudinal direction of the aircraft.

With this configuration, even if any one of the plurality of WOW sensors malfunctions, the steering system appropriately steers the wheels.

With this configuration, even if the speed value of the aircraft is incorrect, the steering system appropriately steers the wheels.

Fourth Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

When the aircraft performs take-off operation and the wheels are off the ground, the WOW sensor stops outputting the WOW signal. Furthermore, the speed of the aircraft is higher than the first limitation speed.

When each of a plurality of WOW sensors does not output the WOW signal, when the speed of the aircraft is higher than the first limitation speed, or when the outputs of the plurality of WOW sensors are not identical and the speed of the aircraft is higher than the second limitation speed, the steering system orients the rotation of the wheels in the longitudinal direction of the aircraft in disregard of the amount of operation.

The second limitation speed is lower than the first limitation speed.

The first limitation speed may be the aircraft speed for safe touchdown at landing.

For example, the steering system shuts off the communications between the upper cable 53 and the lower cable 55 using the cable interlock 54. Then, the shut-off valve 52 shuts off the application of oil pressure on the hydraulic actuators 51.

When the wheels are off the ground, the landing gear 40 extends and the cam mechanism mechanically forcibly orients the rotation of the wheels in the longitudinal direction of the aircraft.

With this configuration, even if any one of the plurality of WOW sensors malfunctions, the steering system appropriately steers the wheels.

With this configuration, even if the speed value of the aircraft is incorrect, the steering system appropriately steers the wheels.

Then, the operation of the steering system at landing will be described with reference to the drawings.

Figure 6:
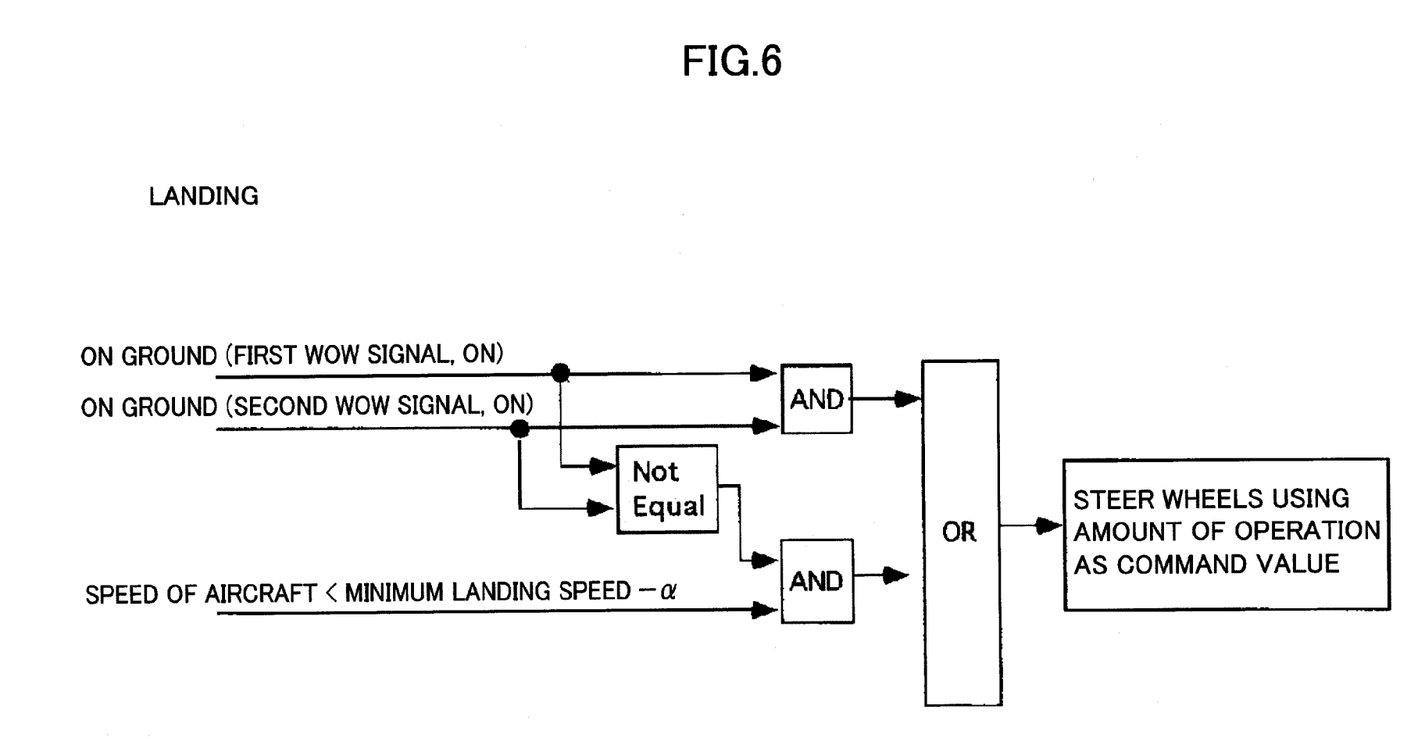
FIG. 6 is a second logic diagram of a wheel steering system according to an embodiment of the present disclosure.

FIG. 6 illustrates the control logic of the steering system at landing.

At Landing

During the flight of the aircraft, the steering system 50 orients the rotation of the wheels in the longitudinal direction of the aircraft in disregard of the amount of operation. For example, the steering system shuts off the communications between the upper cable 53 and the lower cable 55 using the cable interlock 54. Then, the shut-off valve 52 shuts off the application of oil pressure on the hydraulic actuators 51.

For example, during the flight of the aircraft, the WOW sensor does not output the WOW signal. The speed of the aircraft is higher than first limitation speed.

When the aircraft performs the landing operation and the wheels touch down, the WOW sensor outputs the WOW signal. Furthermore, the speed of the aircraft is lower than the first limitation speed.

When a plurality of WOW sensors output WOW signals, or when the outputs of the plurality of WOW sensors are not identical and the speed of the aircraft is lower than the second limitation speed, the steering system 50 steers the wheels 30 using the amount of operation as a command value after a predetermined time has passed.

When the wheels touch down, the landing gear 40 retracts and the cam mechanism does not mechanically forcibly orient the rotation of the wheels in the longitudinal direction of the aircraft.

The second limitation speed may be lower than the aircraft speed for safe touchdown at landing.

For example, the steering system allows the communications between the upper cable 53 and the lower cable 55 using the cable interlock 54. Then, the shut-off valve 52 is off so that oil pressure is applied on the hydraulic actuators 51.

The pilot operates the control system, thereby steering the wheels in accordance with the operated physical amount.

With this configuration, even if any one of the plurality of WOW sensors malfunctions, the steering system appropriately steers the wheels.

With this configuration, even if the speed value of the aircraft is incorrect, the steering system appropriately steers the wheels.

Next, a landing gear assembly according to a second embodiment of the present disclosure will be described.

Figure 3:
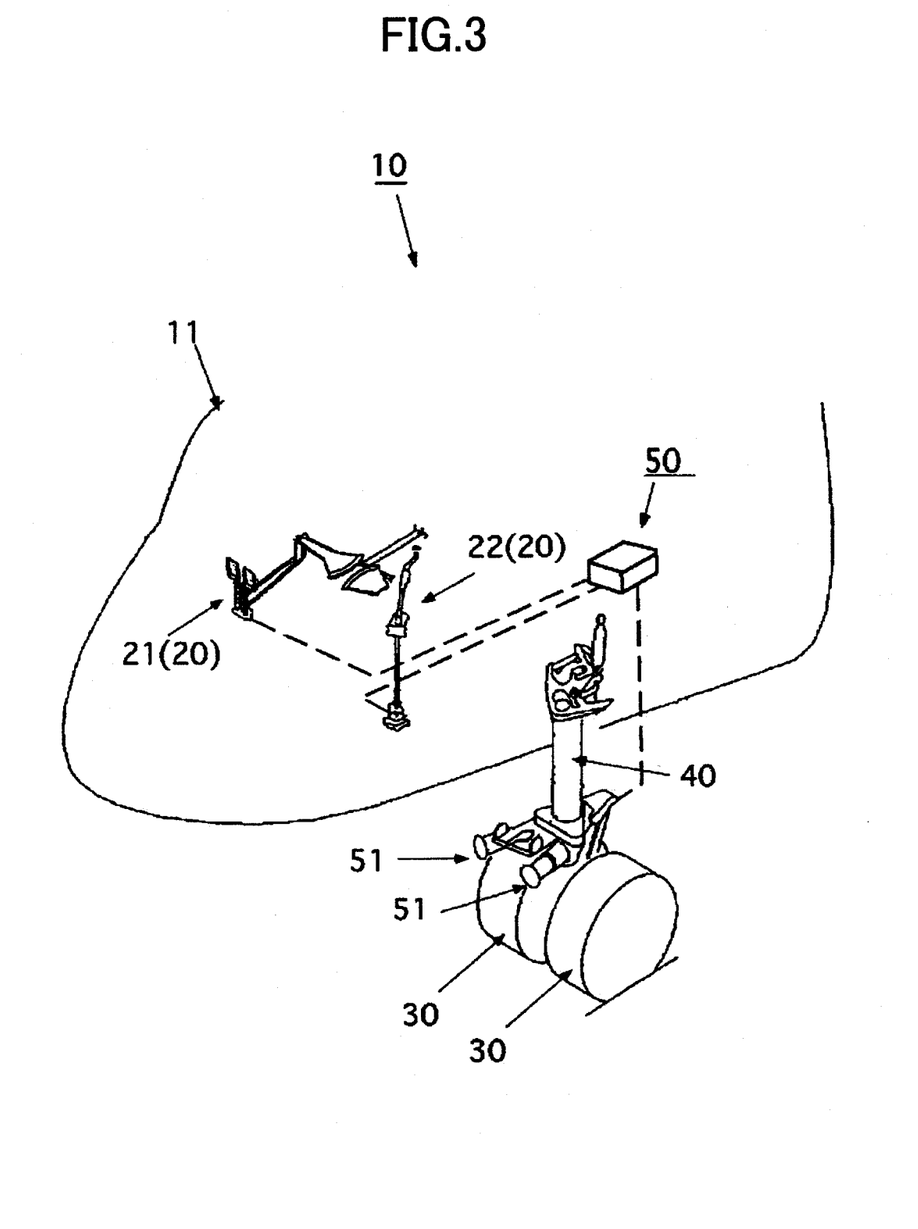
FIG. 3 is a conceptual view of a landing gear assembly according to a second embodiment of the present disclosure.
Figure 4:
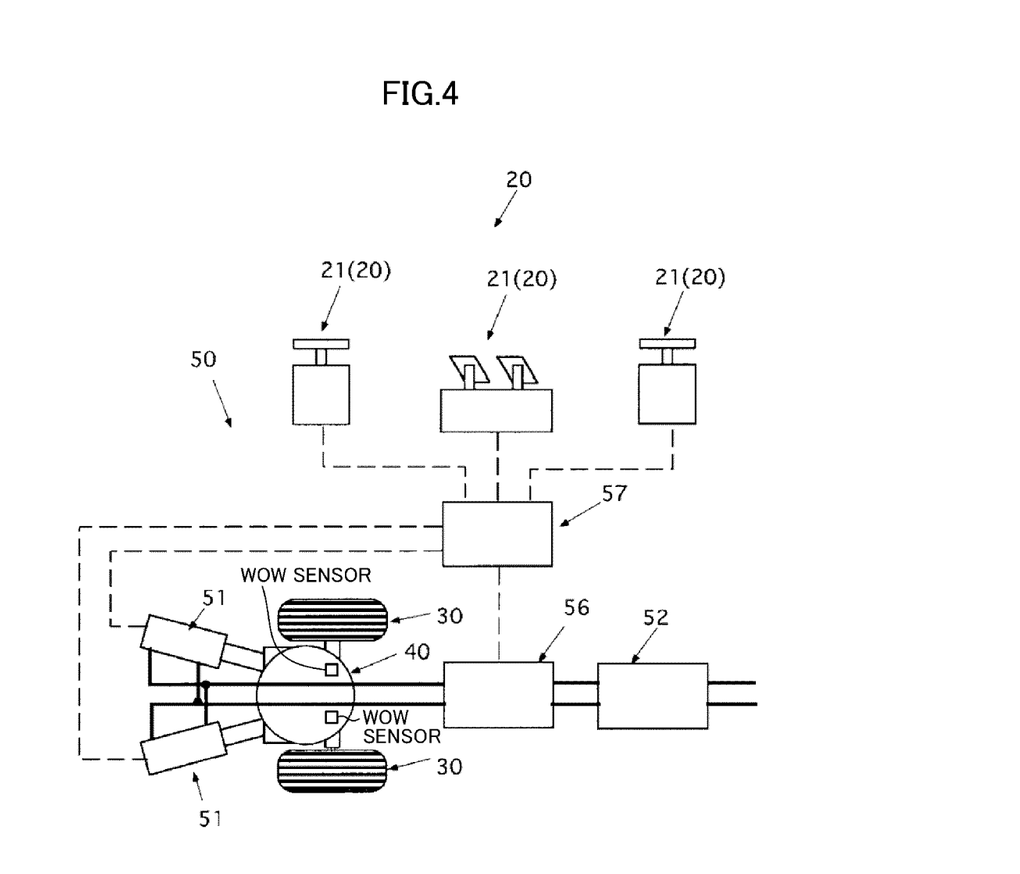
FIG. 4 illustrates a line system of the landing gear assembly according to the second embodiment of the present disclosure.

FIG. 3 is a conceptual view of the landing gear assembly according to the second embodiment of the present disclosure. FIG. 4 illustrates a line system of the landing gear assembly according to the second embodiment.

For simplicity of the explanation, an example will be described where the landing gear assembly is provided in the nose of an aircraft.

The system of the landing gear assembly according to the second embodiment is hereinafter referred to as "steer-by-wire control."

The landing gear assembly of an aircraft supports an aircraft 10 at landing, and includes a control system 20, wheels 30, a landing gear 40, a steering system 50, and a WOW sensor.

The control system 20, the wheels 30, the landing gear 40, and the WOW sensor have the same configurations as those in the landing gear assembly according to the first embodiment, and the explanation thereof is omitted. Only differences will be described.

The steering system 50 steers the wheels 30 using the amount of operation as a command value, and orients the rotation of the wheels in the longitudinal direction of the aircraft in disregard of the amount of operation. The steering system 50 includes hydraulic actuators 51, a shut-off valve 52, a hydraulic control valve 56, and an electronic controller 57.

The hydraulic actuators 51 are cylinders revolving the wheels 30 around the vertical axis in the landing position.

For example, a pair of hydraulic cylinders is provided on the right and left of the landing gear with their shaft centers intersecting each other. In the landing position, when one of the pair of hydraulic cylinders extends and the other retracts, the wheels 30 supported by the landing gear 40 revolve around the vertical axis in the rotation direction of the one. When the one of the pair of hydraulic cylinders retracts and the other extends, the wheels 30 supported by the landing gear 40 revolve around the vertical axis in the rotation direction of the other.

The hydraulic cylinders are of a servo type, and servo controlled by the control valve 56 to extend and retract.

The shut-off valve 52 shuts off the oil pressure applied on the hydraulic actuators 51.

For example, when an off-signal is input to the shut-off valve, the shut-off valve operates to prevent application of the oil pressure on the hydraulic actuators, thereby nullifying the thrust of the hydraulic actuators.

When an on-signal is input to the shut-off valve, the oil pressure is applied on the hydraulic actuators, thereby generating the thrust of the hydraulic actuators.

The hydraulic control valve 56 receives a valve drive signal in the landing position, supplies hydraulic fluid to the hydraulic actuators 51, and controls the revolving angle of the wheels around the vertical axis.

For example, the hydraulic control valve 56 is an electromagnetic valve for servo control, which receives the valve drive signal, and supplies needed hydraulic fluid to the hydraulic cylinders.

The electronic controller 57 is an electronic device, which receives the amount of operation, and outputs the valve drive signal. The electronic controller 57 outputs the valve drive signal to the hydraulic control valve 56 in accordance with the difference between the amount of operation and the revolving degree of the wheels.

Operation of the steering system according to the second embodiment at take-off and at landing will be described individually with reference to the drawings.

First, the operation of the steering system at take-off will be described with reference to the drawings.

FIG. 5 illustrates some control logics of the steering system at take-off.

Four types of control logics will be described below individually.

First Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

The steering system turns on the shut-off valve 52. The amount of operation output from the control system 20 and the amount of extension of the hydraulic actuators 51 are input to the electronic controller 57. The electronic controller 57 generates the valve drive signal from the difference between the amount of operation output from the control system 20 and the amount of extension of the hydraulic actuators 51. Then, the electronic controller 57 inputs the valve drive signal to the hydraulic control valve 56. The hydraulic control valve 56 controls the amount of extension of the hydraulic actuators.

As a result, the pilot operates the control system, thereby steering the wheels in accordance with the amount of operation.

When the aircraft performs take-off operation and the wheels are off the ground, the WOW sensor stops outputting the WOW signal. Furthermore, the speed of the aircraft is higher than the first limitation speed.

When the WOW sensor stops outputting the WOW signal, or when the speed of the aircraft is higher than the first limitation speed, the steering system orients the rotation of the wheels in the longitudinal direction of the aircraft in disregard of the amount of operation.

The first limitation speed may be the aircraft speed for safe touchdown at landing.

For example, the steering system activates the shut-off valve 52 to shut off the supply of the hydraulic fluid. The electronic controller 57 outputs to the hydraulic control valve 56, the valve drive signal for orienting the rotation of the wheels in the longitudinal direction of the aircraft.

When the wheels are off the ground, the landing gear 40 extends the distance between the mounting point of the frame of the aircraft and each axle, and the cam mechanism mechanically forcibly orients the rotation of the wheels in the longitudinal direction of the aircraft.

With this configuration, even if the WOW sensor malfunctions, the steering system appropriately steers the wheels.

With this configuration, even if the speed value of the aircraft is incorrect, the steering system appropriately steers the wheels.

Second Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

The steering system turns on the shut-off valve 52. The amount of operation output from the control system 20 and the amount of extension of the hydraulic actuators 51 are input to the electronic controller 57. The electronic controller 57 generates the valve drive signal from the difference between the amount of operation output from the control system 20 and the amount of extension of the hydraulic actuators 51. Then, the electronic controller 57 inputs the valve drive signal to the hydraulic control valve 56. The hydraulic control valve 56 controls the amount of extension of the hydraulic actuators.

As a result, the pilot operates the control system, thereby steering the wheels in accordance with the amount of operation.

When the aircraft performs take-off operation and the wheels are off the ground, the WOW sensor stops outputting the WOW signal. Furthermore, the speed of the aircraft is higher than the first limitation speed.

When the outputs of the plurality of WOW sensors are not identical, and the speed of the aircraft is higher than the second limitation speed, the steering system orients the rotation of the wheels in the longitudinal direction of the aircraft in disregard of the amount of operation.

The second limitation speed may be lower than the aircraft speed for safe touchdown at landing.

For example, the steering system activates the shut-off valve 52 to shut off the supply of the hydraulic fluid. The electronic controller 57 outputs to the hydraulic control valve 56, the valve drive signal for orienting the rotation of the wheels in the longitudinal direction of the aircraft.

When the wheels are off the ground, the landing gear 40 extends and the cam mechanism mechanically forcibly orients the rotation of the wheels in the longitudinal direction of the aircraft.

With this configuration, even if any one of the plurality of WOW sensors malfunctions, the steering system appropriately steers the wheels.

With this configuration, even if the speed value of the aircraft is incorrect, the steering system appropriately steers the wheels.

Third Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

The steering system turns on the shut-off valve 52. The amount of operation output from the control system 20 and the amount of extension of the hydraulic actuators 51 are input to the electronic controller 57. The electronic controller 57 generates the valve drive signal from the difference between the amount of operation output from the control system 20 and the amount of extension of the hydraulic actuators 51. Then, the electronic controller 57 inputs the valve drive signal to the hydraulic control valve 56. The hydraulic control valve 56 controls the amount of extension of the hydraulic actuators.

As a result, the pilot operates the control system, thereby steering the wheels in accordance with the amount of operation.

When the aircraft performs take-off operation and the wheels are off the ground, the WOW sensor stops outputting the WOW signal. Furthermore, the speed of the aircraft is higher than the first limitation speed.

When the speed of the aircraft is higher than the first limitation speed, or when the outputs of the plurality of WOW sensors are not identical and the speed of the aircraft is higher than the second limitation speed, the steering system orients the rotation of the wheels in the longitudinal direction of the aircraft in disregard of the amount of operation.

The second limitation speed may be lower than the aircraft speed for safe touchdown at landing.

For example, the steering system activates the shut-off valve 52 to shut off the supply of the hydraulic fluid. The electronic controller 57 outputs to the hydraulic control valve 56, the valve drive signal for orienting the rotation of the wheels in the longitudinal direction of the aircraft.

When the wheels are off the ground, the landing gear 40 extends and the cam mechanism mechanically forcibly orients the rotation of the wheels in the longitudinal direction of the aircraft.

With this configuration, even if any one of the plurality of WOW sensors malfunctions, the steering system appropriately steers the wheels.

With this configuration, even if the speed value of the aircraft is incorrect, the steering system appropriately steers the wheels.

Fourth Example at Take-Off

When the aircraft taxis, the steering system 50 steers the wheels 30 using the amount of operation as a command value.

For example, when the aircraft taxis, the WOW sensor outputs the WOW signal, and the speed of the aircraft is lower than first limitation speed.

The steering system turns on the shut-off valve 52. The amount of operation output from the control system 20 and the amount of extension of the hydraulic actuators 51 are input to the electronic controller 57. The electronic controller 57 generates the valve drive signal from the difference between the amount of operation output from the control system 20 and the amount of extension of the hydraulic actuators 51. Then, the electronic controller 57 inputs the valve drive signal to the hydraulic control valve 56. The hydraulic control valve 56 controls the amount of extension of the hydraulic actuators.

As a result, the pilot operates the control system, thereby steering the wheels in accordance with the amount of operation.

When the aircraft performs take-off operation and the wheels are off the ground, the WOW sensor stops outputting the WOW signal. Furthermore, the speed of the aircraft is higher than the first limitation speed.

When each of a plurality of WOW sensors does not output the WOW signal, when the speed of the aircraft is higher than the first limitation speed, or when the outputs of the plurality of WOW sensors are not identical and the speed of the aircraft is higher than the second limitation speed, the steering system orients the rotation of the wheels in the longitudinal direction of the aircraft in disregard of the amount of operation.

The second limitation speed is lower than the first limitation speed.

The first limitation speed may be the aircraft speed for safe touchdown at landing.

For example, the steering system activates the shut-off valve 52 to shut off the supply of the hydraulic fluid. The electronic controller 57 outputs to the hydraulic control valve 56, the valve drive signal for orienting the rotation of the wheels in the longitudinal direction of the aircraft.

When the wheels are off the ground, the landing gear 40 extends and the cam mechanism mechanically forcibly orients the rotation of the wheels in the longitudinal direction of the aircraft.

With this configuration, even if any one of the plurality of WOW sensors malfunctions, the steering system appropriately steers the wheels.

With this configuration, even if the speed value of the aircraft is incorrect, the steering system appropriately steers the wheels.

Then, the operation of the steering system at landing will be described with reference to the drawings.

FIG. 6 illustrates the control logic of the steering system at landing.

At Landing

During the flight of the aircraft, the steering system 50 orients the rotation of the wheels in the longitudinal direction of the aircraft in disregard of the amount of operation.

For example, the steering system activates the shut-off valve 52 to shut off the supply of the hydraulic fluid. The electronic controller 57 outputs to the hydraulic control valve 56, the valve drive signal for orienting the rotation of the wheels in the longitudinal direction of the aircraft.

For example, during the flight of the aircraft, the WOW sensor does not output the WOW signal. The speed of the aircraft is higher than the first limitation speed.

When the aircraft performs the landing operation and the wheels touch down, the WOW sensor outputs the WOW signal. Furthermore, the speed of the aircraft is lower than the first limitation speed.

When each of a plurality of WOW sensors outputs WOW signals, or when the outputs of the plurality of WOW sensors are not identical and the speed of the aircraft is lower than the second limitation speed, the steering system steers the wheels using the amount of operation as a command value after a predetermined time has passed.

When the wheels touch down, the landing gear 40 retracts and the cam mechanism does not mechanically forcibly orient the rotation of the wheels in the longitudinal direction of the aircraft.

The second limitation speed may be lower than the aircraft speed for safe touchdown at landing.

The steering system turns on the shut-off valve 52. The amount of operation output from the control system 20 and the amount of extension of the hydraulic actuators 51 are input to the electronic controller 57. The electronic controller 57 generates the valve drive signal from the difference between the amount of operation output from the control system 20 and the amount of extension of the hydraulic actuators 51. Then, the electronic controller 57 inputs the valve drive signal to the hydraulic control valve 56. The hydraulic control valve 56 controls the amount of extension of the hydraulic actuators.

As a result, the pilot operates the control system, thereby steering the wheels in accordance with the amount of operation.

The pilot operates the control system, thereby steering the wheels in accordance with the operated physical amount.

With this configuration, even if any one of the plurality of WOW sensors malfunctions, the steering system appropriately steers the wheels.

With this configuration, even if the speed value of the aircraft is incorrect, the steering system appropriately steers the wheels.

The landing gear assembly of the aircraft according to the above-described embodiment provides the following advantages.

The control system outputs the amount of operation corresponding to the operated physical amount. The landing gear 40 is supported by the frame of the aircraft, and rotatably supports the wheels 30. The WOW sensor does not output the WOW signal when the weight of the aircraft does not act on the wheels 30, and outputs the WOW signal when the weight of the aircraft acts on the wheels 30. With use of the landing gear assembly with this configuration, in a take-off step, the steering system 50 steers the wheels 30 using the amount of operation as a command value. When the WOW sensor stops outputting the WOW signal, or the speed of the aircraft is higher than the first limitation speed, the steering system 50 orients the rotation of the wheels 30 in the longitudinal direction of the aircraft in disregard of the amount of operation. As a result, the wheels can be steered by operating the control system before take-off, and the rotation of the wheels can be oriented in the longitudinal direction of the aircraft in disregard of the control system after the take-off.

In the above-described landing gear assembly, which includes the plurality of WOW sensors, the steering system 50 steers the wheels 30 using the amount of operation as the command values in the take-off step. When the outputs of the plurality of WOW sensors are not identical and the speed of the aircraft is higher than the second limitation speed, the steering system 50 orients the rotation of the wheels in the longitudinal direction of the aircraft in disregard of the amount of operation. As a result, the wheels are steered by operating the control system before take-off, and the rotation of the wheels is oriented in the longitudinal direction of the aircraft in disregard of the control system after the take-off.

In the above-described landing gear assembly, which includes the plurality of WOW sensors, in the take-off step, the steering system 50 steers the wheels 30 using the amount of operation as the command value. When the speed of the aircraft is higher than the first limitation speed, or when the outputs of the plurality of WOW sensors are not identical and the speed of the aircraft is higher than the second limitation speed, the steering system orients the rotation of the wheels in the longitudinal direction of the aircraft in disregard of the amount of operation. As a result, the wheels are steered by operating the control system before take-off, and the rotation of the wheels is oriented in the longitudinal direction of the aircraft in disregard of the control system after the take-off.

In the above-described landing gear assembly, which includes the plurality of WOW sensors, in the take-off step, the steering system 50 steers the wheels 30 using the amount of operation as the command value. When the plurality of WOW sensors stop outputting the WOW signals, when the speed of the aircraft is higher than the first limitation speed, or when the outputs of the plurality of WOW sensors are not identical and the speed of the aircraft is higher than the second limitation speed, the steering system 50 orients the rotation of the wheels in the longitudinal direction of the aircraft in disregard of the amount of operation. As a result, the control system 20 is operated to steer the wheels 30 before take-off, and the rotation of the wheels is oriented in the longitudinal direction of the aircraft in disregard of the control system after the take-off.

The control system outputs the amount of operation corresponding to the operated physical amount. The landing gear is supported by the frame of the aircraft, and rotatably supports the wheels. The steering system orients the rotation of the wheels in the longitudinal direction of the aircraft in disregard of the amount of operation. Each of the plurality of WOW sensors does not output a WOW signal when a weight of the aircraft does not act on the wheels, and outputs the WOW signal when the weight of the aircraft acts on the wheels. With use of the landing gear assembly with this configuration, in a take-off step, the steering system orients the rotation of the wheels in the longitudinal direction of the aircraft in disregard of the amount of operation. When the plurality of WOW sensors output the WOW signals, or when the outputs of the plurality of WOW sensors are not identical and the speed of the aircraft is lower than the second limitation speed, the steering system 50 steers the wheels 30 using the amount of operation as the command value. As a result, the rotation of the wheels can be oriented in the longitudinal direction of the aircraft before landing, and the wheels can be steered by operating the control system after the landing.

The second limitation speed is lower than the aircraft speed for safe touchdown at landing. As a result, whether or not the wheels touch down can be reliably determined.

The first limitation speed is the aircraft speed for safe touchdown at landing. As a result, whether or not the wheels touch down can be reliably determined.

The landing gear 40 increases and decreases the distance between the mounting point of the frame of the aircraft 10 and the axle of each wheel 30. When the distance increases, the cam mechanism mechanically forcibly orients the rotation of the wheels 30 in the longitudinal direction of the aircraft 10. The steering system 50 includes the electronic controller 57, the hydraulic actuators 51, the hydraulic control valve 56, and the shut-off valve 52. The steering system 50 activates the shut-off valve 52 to shut off supply of the hydraulic fluid so that the rotation of the wheels is oriented in the longitudinal direction of the aircraft in disregard of the amount of operation. The electronic controller 57 outputs to the hydraulic control valve 56, the valve drive signal for orienting the rotation of the wheels in the longitudinal direction of the aircraft. Even if the shut-off valve 52 or the electronic controller 57 malfunctions, the rotation of the wheels can be oriented in the longitudinal direction of the aircraft when the wheels do not touch down.

The present disclosure is not limited to the above-described embodiments, and various modification can be made within the scope of the invention.

While an example has been described where the steering system is applied to the front wheels, the present disclosure is not limited thereto. The steering system is applicable to main wheels supported by the wings or the center of the frame.

While an example has been described where the aircraft is an example air vehicle, the present disclosure is not limited thereto. The air vehicle may be a floating train or a space plane.

While the described logics are used to determine whether or not to accept steering of the wheels at landing and take-off, the present disclosure is not limited thereto. This logic at landing may be also used for touch down protection for brake control.

While an example has been described where the detection sensor is the WOW sensor, the present disclosure is not limited thereto. The detection sensor may be, for example, a gear down sensor.

What is claimed is:

1. A landing gear assembly of an aircraft comprising:
a control system configured to output an amount of operation corresponding to an operated physical amount;
a wheel;
a landing gear supported by an aircraft frame, and configured to rotatably support the wheel;
a plurality of detection sensors, each configured not to output a detection signal if the aircraft flies in air, and to output the detection signal if the aircraft stays on ground; and
a steering system configured to steer the wheel using the amount of operation as a command value if the plurality of detection sensors output the respective detection signals, and orient rotation of the wheel in a longitudinal direction of the aircraft in disregard of the amount of operation if the plurality of detection sensors do not output the respective detection signals,
wherein the steering system is configured to orient the rotation of the wheel in the longitudinal direction of the aircraft in disregard of the amount of operation if outputs of the plurality of detection sensors are not identical, and speed of the aircraft is higher than a second limitation speed.

2. The landing gear assembly of claim 1, wherein the second limitation speed is lower than aircraft speed for safe touchdown at landing.

3. The landing gear assembly of claim 1, wherein
the landing gear is configured to extend and retract, and mechanically forcibly orient the rotation of the wheel in the longitudinal direction of the aircraft when extending,
the steering system includes
an electronic controller configured to receive the amount of operation, and to output a valve drive signal,
a hydraulic actuator configured to revolve the wheel around a vertical axis,
a hydraulic control valve configured to receive the valve drive signal, and to supply hydraulic fluid to the hydraulic actuator to control a revolving angle of the wheel, and
a shut-off valve configured to shut off the hydraulic fluid supplied to the hydraulic control valve,
the steering system activates the shut-off valve to shut off supply of the hydraulic fluid so that the rotation of the wheel is oriented in the longitudinal direction of the aircraft in disregard of the amount of operation, and
the electronic controller inputs to the hydraulic control valve, the valve drive signal for orienting the rotation of the wheel in the longitudinal direction of the aircraft.

4. The landing gear assembly of claim 1,
wherein the detection sensor is a weight on wheels sensor not outputting the detection signal if a weight of the aircraft does not act on the wheel, and outputting the detection signal if the weight of aircraft acts on the wheel.

5. The landing gear assembly of claim 1, wherein
the wheel is supported by the landing gear to revolve around a vertical axis,
the steering system sets a revolving angle of the wheel using the amount of operation as the command value, and
in disregard of the amount of operation, the steering system sets the revolving angle of the wheel so that the rotation of the wheel is oriented in the longitudinal direction of the aircraft.

6. The landing gear assembly of claim 1, wherein
the steering system is configured to orient the rotation of the wheel in the longitudinal direction of the aircraft in disregard of the amount of operation if speed of the aircraft is higher than a first limitation speed, and
the second limitation speed is lower than the first limitation speed.

7. The landing gear assembly of claim 6, wherein the second limitation speed is lower than aircraft speed for safe touchdown at landing.

8. The landing gear assembly of claim 6, wherein the first limitation speed is aircraft speed for safe touchdown at landing.

9. The landing gear assembly of claim 6, wherein
the landing gear is configured to extend and retract, and mechanically forcibly orient the rotation of the wheel in the longitudinal direction of the aircraft if extending,
the steering system includes
an electronic controller configured to receive the amount of operation, and to output a valve drive signal,
a hydraulic actuator configured to revolve the wheel around a vertical axis, a hydraulic control valve configured to receive the valve drive signal, and to supply hydraulic fluid to the hydraulic actuator to control a revolving angle of the wheel, and a shut-off valve configured to shut off the hydraulic fluid supplied to the hydraulic control valve, the steering system activates the shut-off valve to shut off supply of the hydraulic fluid so that the rotation of the wheel is oriented in the longitudinal direction of the aircraft in disregard of the amount of operation, and the electronic controller inputs to the hydraulic control valve, the valve drive signal for orienting the rotation of the wheel in the longitudinal direction of the aircraft.

10. The landing gear assembly of claim 6, wherein the detection sensor is a weight on wheels sensor not outputting the detection signal if a weight of the aircraft does not act on the wheel, and outputting the detection signal when the weight of aircraft acts on the wheel.

11. A landing gear assembly of an aircraft comprising:
a control system configured to output an amount of operation corresponding to an operated physical amount;
a wheel;
a landing gear supported by an aircraft frame, and configured to rotatably support the wheel;
a plurality of detection sensors, each configured not to output a detection signal if the aircraft flies in air, and to output the detection signal if the aircraft stays on ground; and
a steering system configured to steer the wheel using the amount of operation as the command value if the plurality of detection sensors output the respective detection signals, and orient rotation of the wheel in a longitudinal direction of the aircraft in disregard of the amount of operation if speed of the aircraft is higher than a first limitation speed,
wherein the steering system is configured to orient the rotation of the wheel in the longitudinal direction of the aircraft in disregard of the amount of operation if outputs of the plurality of detection sensors are not identical and the speed of the aircraft is higher than a second limitation speed, and
the second limitation speed is lower than the first limitation speed.

12. The landing gear assembly of claim 11, wherein second limitation speed is lower than aircraft speed for safe touchdown at landing.

13. The landing gear assembly of claim 11, wherein the first limitation speed is aircraft speed for safe touchdown at landing.

14. The landing gear assembly of claim 11, wherein
the landing gear is configured to extend and retract, and mechanically forcibly orient the rotation of the wheel in the longitudinal direction of the aircraft if extending,
the steering system includes
an electronic controller configured to receive the amount of operation, and to output a valve drive signal,
a hydraulic actuator configured to revolve the wheel around a vertical axis,
a hydraulic control valve configured to receive the valve drive signal, and to supply hydraulic fluid to the hydraulic actuator to control a revolving angle of the wheel, and
a shut-off valve configured to shut off the hydraulic fluid supplied to the hydraulic control valve, the steering system activates the shut-off valve to shut off supply of the hydraulic fluid so that the rotation of the wheel is oriented in the longitudinal direction of the aircraft in disregard of the amount of operation, and the electronic controller inputs to the hydraulic control valve, the valve drive signal for orienting the rotation of the wheel in the longitudinal direction of the aircraft.

15. The landing gear assembly of claim 11, wherein
the detection sensor is a weight on wheels sensor not outputting the detection signal when a weight of the aircraft does not act on the wheel, and outputting the detection signal if the weight of aircraft acts on the wheel.

16. A landing gear assembly of an aircraft comprising:
a control system configured to output an amount of operation corresponding to an operated physical amount;
a wheel;
a landing gear supported by an aircraft frame, and configured to rotatably support the wheel;
a plurality of detection sensors, each configured not to output a detection signal if the aircraft flies in air, and to output the detection signal if the aircraft stays on ground; and
a steering system configured to orient the rotation of the wheel in a longitudinal direction of the aircraft in disregard of the amount of operation if the plurality of detection sensors do not output the respective detection signals, and steer the wheel using the amount of operation as a command value if the plurality of detection sensors output the respective detection signals,
wherein the steering system is configured to steer the wheel using the amount of operation as the command value if outputs of the plurality of detection sensors are not identical and speed of the aircraft is lower than a second limitation speed.

17. The landing gear assembly of claim 16, wherein the second limitation speed is lower than aircraft speed for safe touchdown at landing.

18. The landing gear assembly of claim 16, wherein
the landing gear is configured to extend and retract, and mechanically forcibly orient the rotation of the wheel in the longitudinal direction of the aircraft if extending,
the steering system includes
an electronic controller configured to receive the amount of operation, and to output a valve drive signal,
a hydraulic actuator configured to revolve the wheel around a vertical axis,
a hydraulic control valve configured to receive the valve drive signal, and to supply hydraulic fluid to the hydraulic actuator to control a revolving angle of the wheel, and
a shut-off valve configured to shut off the hydraulic fluid supplied to the hydraulic control valve,
the steering system activates the shut-off valve to shut off supply of the hydraulic fluid so that the rotation of the wheel is oriented in the longitudinal direction of the aircraft in disregard of the amount of operation, and
the electronic controller inputs to the hydraulic control valve, the valve drive signal for orienting the rotation of the wheel in the longitudinal direction of the aircraft.

19. The landing gear assembly of claim 16, wherein
the detection sensor is a weight on wheels sensor not outputting the detection signal when a weight of the aircraft does not act on the wheel, and outputting the detection signal if the weight of aircraft acts on the wheel.

* * * * *